May 4, 1965     C. W. PITTMAN     3,181,814
MISSILE TARGET INTERCEPT ANGLE MEASURING SYSTEM
Filed Nov. 7, 1961
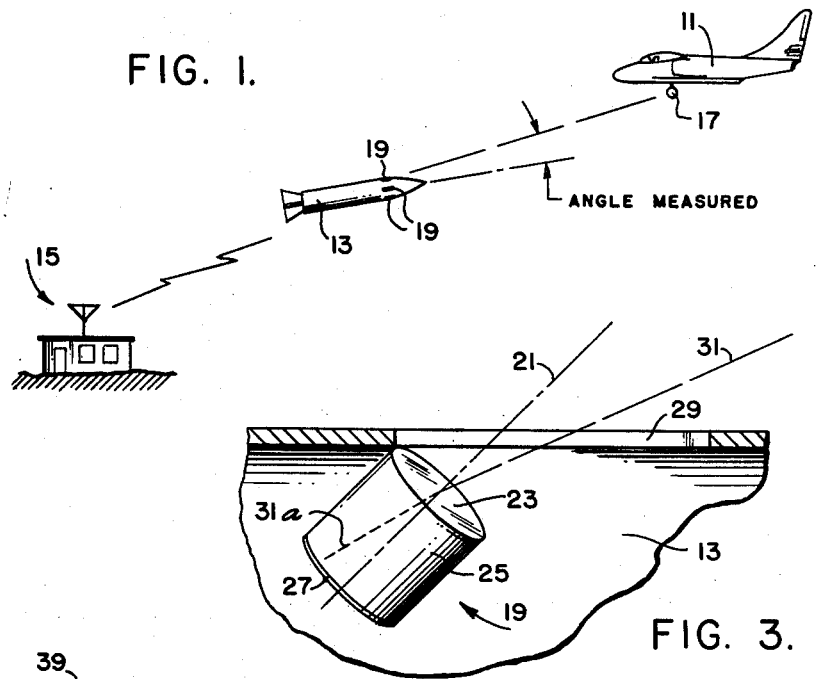
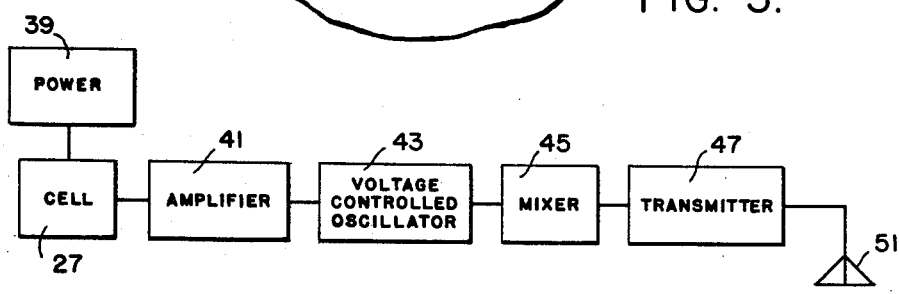
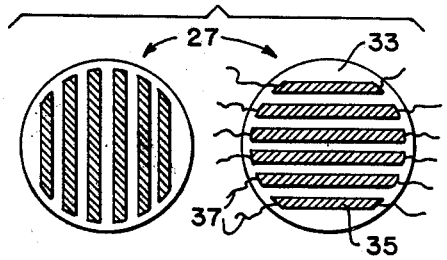
INVENTOR.
CHARLES W. PITTMAN
BY
*P. H. Firsht*
ATTORNEY.

3,181,814
MISSILE TARGET INTERCEPT ANGLE MEASURING SYSTEM
Charles W. Pittman, Norfolk, Va., assignor to the United States of America as represented by the Secretary of the Navy
Filed Nov. 7, 1961, Ser. No. 150,848
2 Claims. (Cl. 244—14)
(Granted under Title 35, U.S. Code (1952), sec. 266)

The invention herein described may be manufactured and used by or for the Government of the United States of America for governmental purposes without the payment of any royalties thereon or therefor.

The present invention relates to a telemetering instrumentation system, and more particularly to a missile target intercept angle measuring system.

With the advent of high speed missiles and actual testing of the same against targets, the need for obtaining information relative to the interception of the target by the missile to determine the miss distance or firing error of the missile has become very important. One of the requirements of intercept instrumentation of a test missile with a target is the determination of the bearing of the target measured from the longitudinal axis of the missile to an accuracy of a few degrees during the period of intercept.

One system makes use of cameras mounted in the target aircraft which photograph the missile during flight and the camera records are later analyzed to obtain target intercept data. However, this system has the disadvantage in that it is accurate only to within plus or minus 30° because of the usual high closing rates encountered between the target and the missile.

It is therefore an object of the present invention to provide a system for obtaining accurate information of the angle of intercept of the target by the missile.

Another object is the provision of a missile target intercept angle measuring system in which the desired data are telemetered to means on the ground where they may give the record of the angle between the missile and the target as the missile travels along its trajectory.

Still another object is the provision of sensing devices on the missile which produce signals indicative of the angle between the missile and the target, which signals are telemetered and recorded to provide target intercept information.

Other objects and many of the attendant advantages of this invention will become readily appreciated as the same becomes better understood by reference to the following detailed description when considered in connection with the accompanying drawings wherein:

FIG. 1 is a schematic view illustrating the system of the present invention;

FIG. 2 is a block diagram illustrating the telemetering portion of the system;

FIG. 3 is an enlarged detailed sectional view of the portion of the missile showing the radiation sensing device; and FIG. 4 is an enlarged schematic plan view of the radiation sensitive cells of a pair of adjacent sensing devices showing the radiation sensitive strip thereof and illustrating one way of orienting the strips relative to each other.

Referring now to the drawings, wherein like reference characters designate like or corresponding parts throughout the several views, there is shown in FIG. 1 a target aircraft 11, a test missile 13 and receiving and recording means 15. The aircraft 11 is adapted to carry a source of radiation 17, for example, a flare for producing light or infrared radiation. Missile 13 is provided with a plurality of sensing devices 19 circumferentially spaced about the periphery of the missile and oriented to sense radiation in a wide angle ahead and to the side of the missile.

Referring now to FIG. 3, there is shown a portion of the missile 13 and a sensing device 19 therein. Sensing device 19 may take any suitable form, for example, that of an optical device which will place an image of the light or other radiation from the source 17 on a suitably sensitized grid, the image being placed on the grid or plate according to the optical characteristics of the device and the angle which the radiation source makes with the optical axis of the device. In one example, the sensing device may take the form of an optical system having an optical axis 21 and comprising a wide angle lens 23 supported in one end of a casing 25 and a radiation sensitive cell at 27 at the other end thereof, the missile 13 being provided with a window or port 29 for admitting rays of light or other radiation 31 to the optical system. The makeup of cell 27 may incorporate photocells of the types referred to in Section 5 of "Handbook of Semiconductor Electronics" by Lloyd P. Hunter, McGraw-Hill Book Company, Inc. (1956).

As shown in FIG. 4, the radiation sensitive cell 27 may be in the form of a plate or grid 33 made up of a plurality of radiation sensitive strips 35, such as discrete layers of lead sulfide, cadmium sulfide, cadmium selenide, or the like, deposited on the plate or grid, suitable electrical leads 37 being connected to the strips 35 for power supply and for signal pickoff.

The radiation sensitive strips 35 possess the characteristic of varying the voltage thereon in accordance with the position of an image from a light or other radiation source. That is, since the relative distance and bearing of the target varies with relative motion between the missile and target and since the lens 23 positions the image in accordance with the characteristics of the optical system and the angle which the light or radiation source makes with the optical system axis, the signal produced by light or other radiation impinging on the sensitive strip varies according to the changing relationship of the missile and target. Thus, in a traverse of the missile past the target the light image impinges on the strips in consecutive order whereby the cell output is modulated and a series of signal pulses is produced which is indicative of the angular bearing or direction of the radiation source, the trajectory of the missile being so chosen that the light image traverses or scans the strips commencing with the first strip. Such signals are impressed on a suitable telemetering channel and relayed to the telemetering receiving and recording means 15. Simultaneously, information of the missile fuze is telemetered to the recording means 15, actuation of the fuze being indicated by a signal pulse which is correlated in a conventional manner with the signal pulses generated by plate 33. Reduction of the telemetry records furnishes a record of the angles seen by the sensing device and other information for determining values of the intercept, such as the miss distance, missile trajectory and time. By suitably orienting the optical axes of several sensing devices, it is possible to measure the conical angle off the nose of the missile over a typical range of 30 to 70° to an accuracy of 1° and a response time of ⅛ of a millisecond. If desired, the long axes of the sensitive strips in one sensing device may be oriented so as to be disposed transversely of the long axes of the sensitive strips in adjacent sensing devices; see FIG. 4.

In FIG. 2, there is shown one manner of telemetering the intercept angle information. In this form, the radiation sensitive cell 27 is connected to a power supply 39 adapted to impress a voltage on each of the sensitive strips 35 thereof. The cell 27 is also suitably connected to an amplifier 41 which amplifies the signal produced when light or other radiation impinges upon a sensitive strip 35. The amplified signal is fed through a voltage controlled oscillator 43 and mixer 45 to a transmitter 47 which transmits the signal to a receiver 49 by means of a transmitting antenna 51 and a receiving antenna 53. Associated with receiver 49 is an amplifier 55 which suitably amplifies the received signals for recording by a suitable recorder 57.

In the operation of the measuring system of the present invention, the test missile 13 is directed toward the target aircraft 11 and as the missile approaches the target, the radiation source, the transmitting system and the receiving and recording system are energized. The sensing devices 19 which have the radiation source 17 within their angle of view receive radiation from the source, the lens 23 placing the image of this source on the grid or plate 33 in accordance with the angle the radiation source makes with the optical system axis and a series of signals indicative of such positioning of the image is produced or generated. The signals generated are transmitted to the receiving and recording means 15 on the ground. Reduction of the telemetry record furnishes data as to the angles seen by the sensing devices from which other values of the intercept may be determined.

Thus, the instant invention provides a telemetering instrumentation system for accurately measuring the angle of intercept between a missile and its target and for obtaining miss distance and trajectory information of the missile.

Obviously many modifications and variations of the present invention are possible in the light of the above teachings. It is therefore to be understood that within the scope of the appended claims the invention may be practiced otherwise than as specifically described.

What is claimed is:

1. A system for measuring the intercept angle between a flying target and a missile in flight, comprising, in combination: a missile having a longitudinal axis; a circular series of light sensitive devices carried by said missile spaced circumferentially thereabout and oriented to sense light in a wide angle ahead and to the side of the missile; each device having a casing, a wide angle lens supported in one end of said casing and having an axis intersecting said missile axis, a light sensitive photocell supported in the other end of said casing and adapted in response to light to generate signals indicative of the angle which the light makes with the lens axis, each photocell including a plate having thereon a plurality of discrete strips of light responsive material arranged in parallel; a source of light carried by said target; means carried by said missile for transmitting signals generated by passage of light across the strips as the missile approaches and passes by the target; and means on the ground for receiving and recording said signals.

2. The system of claim 1, wherein the strips of the photocell of any one device are oriented transversely with respect to the strips of the photocells of the two adjacent devices.

References Cited by the Examiner
UNITED STATES PATENTS

| | | | |
|---|---|---|---|
| 2,616,031 | 10/52 | Nosker. | |
| 2,795,778 | 6/57 | Bagby | 343—12 |
| 2,906,916 | 9/59 | Palmer. | |
| 2,958,866 | 11/60 | Atanasoff | 343—112 |
| 2,975,284 | 3/61 | Osborne. | |
| 2,992,422 | 7/61 | Hayes | 343—122 X |
| 3,046,892 | 7/62 | Cosse et al. | 244—14 |
| 3,074,063 | 1/63 | Horton | 102—70.2 |
| 3,095,564 | 6/63 | Cartwright | 343—12 |
| 3,098,933 | 6/63 | Barasch | 244—14 X |

SAMUEL FEINBERG, *Primary Examiner.*
KATHLEEN H. CLAFFY, *Examiner.*